Patented Dec. 30, 1941

2,267,803

UNITED STATES PATENT OFFICE 2,267,803

FRICTION ELEMENT

Ray E. Spokes, Ann Arbor, Mich., assignor to The American Brake Shoe and Foundry Company, Wilmington, Del., a corporation of Delaware No Drawing. Application August 16, 1938, Serial No. 225,141

13 Claims. (Cl. 106—36)

This invention relates to friction elements and more particularly to elements of the kind employed in the brakes and clutches of automotive vehicles and the like and in other kindred devices.

It has been known heretofore that certain natural pyrobituminous materials including bituminous or soft coal, are useful in a friction element for when such a material is employed in a friction element it undergoes chemical changes when the element is subjected to the temperatures encountered in the use thereof, such temperatures causing a destructive distillation at the friction surface or wearing face of the element to form a tarry or pitchy residue upon such friction surface. Such tarry and pitchy residue has a number of desirable properties when formed on a friction surface among which are that of increasing friction at low pressures and that of increasing the life of such friction elements.

However, when friction elements containing natural pyrobituminous materials are subjected to heavy duty use or severe service conditions relatively high temperatures result which may cause the natural pyrobituminous materials in the elements to tend to shrink in volume due to a rapid loss or escape of the volatile fractions, including gases, contained in such materials, prior to the liberation or formation of the desired tarry or pitchy residue upon the friction surfaces or wearing faces of the elements. It has been found that the loss or escape of such fraction from natural pyrobituminous materials, prior to the formation or liberation of the desired residue of tars and pitches, may tend to damage the structure of friction elements containing such materials by rendering them porous at the friction surfaces thereof and by inducing cracking or other disintegration at or immediately below such friction surfaces.

It has also been found in some instances that the mineral ash developed from natural pyrobituminous material on the wearing face or friction surface of a friction element as a result of the destructive distillation which is necessary to form or liberate the desired tars and pitches from the material may tend to impart an undesirable roughness to the friction surface of such a friction element particularly when such an element is subjected to heavy duty service where the destructive distillation of the material is effected rapidly.

Hence the use of a natural pyrobituminous material such as bituminous coal, in a friction element which is intended for heavy duty use, or severe service conditions, may not always be entirely satisfactory, although it has been found that the use of such materials in friction elements is satisfactory in elements intended for ordinary and lighter usage, that is, for use upon automobiles and light trucks and wherever such friction elements are not subjected to severe service conditions or abuse in use.

It has also been found that when friction elements containing certain natural pyrogenous residues, such as asphaltic pitches, are subjected to heavy duty use, or severe service conditions, there is a tendency for such materials, if used in amounts sufficient to afford an even useful distribution thereof in the friction elements, to bleed out to the friction surfaces where they tend to become fusible and glaze over the friction surfaces of the elements and cause loss of friction, and this is especially true at the higher temperatures and under the severe braking conditions to which friction elements are sometimes subjected in present day use.

It may be added, in this connection, that another practical difficulty which is sometimes experienced in the use of certain pyrogenous residues, such as asphaltic pitch, in friction elements, is the fact that if such materials are used in friction elements in quantities sufficient to afford an even useful distribution thereof in the elements there is a tendency for such materials to provide an excess of lubrication due to the effectiveness of such materials as lubricants at high temperatures. On the other hand, if such materials are used in lesser quantities, that is, in quantities sufficient to prevent excess lubrication of the friction surface at high temperatures then there is apt to be difficulty in securing an even and uniform useful distribution of the material in the friction element.

Accordingly, an object of the present invention is to realize in a friction element the desirable properties that accrue when natural pyrobituminous materials, such as bituminous coal and certain natural pyrogenous residues such as asphaltic pitches, are employed therein, without encountering the foregoing and other objectionable properties which are sometimes entailed in the use of one or more of such materials in a friction element especially when it is subjected to heavy duty use or severe service conditions.

Another object of the present invention is to employ in a friction element a material in which tarry and pitchy substances are uniformly distributed to be readily and immediately available upon the friction surface of the element when the element is put to use to thereby provide a film of such tarry and pitchy substances on the friction surface having the same desirable friction properties that are imparted to friction elements by natural pyrobituminous materials, such as bituminous coal, and by certain natural pyrogenous residues such as asphaltic pitches, but without encountering the foregoing and other undesirable properties which are sometimes experienced in the use of friction elements containing natural pyrobituminous materials and natural pyrogenous residues especially when such friction elements are subjected to heavy duty use or severe service conditions and consequent high temperatures, in use.

Another object of the present invention is to employ in a friction element a material which will function efficiently under heavy duty and severe service conditions and consequent high temperatures.

It is to be understood in this connection that friction elements containing natural pyrobituminous materials such as soft coal, and certain pyrogenous residues such as natural asphalts, function satisfactorily under ordinary and less severe service conditions and consequent lower temperatures, and, in the case of natural pyrobituminous materials, such as soft coal, where the destructive distillation to which such material is subjected in the friction element is not carried out too rapidly and the friction element is not abused.

Hence it may be said that friction elements containing the material which is contemplated by the present invention function most effectively at those temperatures and under those conditions of service where friction elements containing natural pyrobituminous materials or certain pyrogenous residues sometimes exhibit one or more of the foregoing or other difficulties which are sometimes experienced when friction elements containing such materials are subjected to heavy duty use and severe service conditions and consequent high temperatures.

I have found that petroleum coke, which, as is well known, is a by-product of the destructive distillation and refining of petroleum, may be advantageously used in friction elements intended for heavy duty use or severe service conditions, in place of natural pyrobituminous materials, such as bituminous coal and in place of certain natural pyrogenous residues, such as asphaltic pitches, and that when so used petroleum coke imparts to such friction elements the desirable properties which are possessed by friction elements containing natural pyrobituminous materials, such as soft coal, or natural pyrogenous residues, such as asphaltic pitches, without the undesirable properties which are sometimes experienced when friction elements containing such materials are subjected to heavy duty use or severe service conditions and consequent high temperatures.

Among the reasons why petroleum coke may advantageously be used in friction elements and especially those which are intended for heavy duty use or severe service conditions, are the following; it being noted in connection with the following that the tarry or pitchy content of petroleum coke, which consists largely of asphaltic compounds and which is sometimes known as "carboids," is soluble in benzol, and hence, is sometimes referred to or known as the "benzol soluble" content:

(a) It has been found that this tarry or pitchy content of petroleum coke is uniformly distributed throughout the carbonaceous mass or carrier portion thereof, due to the method by which petroleum coke is manufactured, and is available for immediate use at the friction surface of a friction element in which it is used without the necessity for subjecting the petroleum coke at the friction surface or wearing surface of the element to a destructive distillation process, in order to secure or form the desired tarry or pitchy material or residue, as is necessary in the case of a friction element containing natural pyrobituminous materials such as soft coal which, unlike petroleum coke, contain no tarry or pitchy materials as such but from which tarry or pitchy materials are formed as a residue only during the process of destructive distillation.

(b) The porous character of the carbonaceous mass in petroleum coke causes it to retain the tarry or pitchy content thereof uniformly throughout such mass. Such uniform distribution of the tarry or pitchy content of petroleum coke makes it possible to distribute such tarry or pitchy content uniformly throughout friction elements containing such material merely by effecting proper distribution of the coke throughout the elements;

(c) Even though the tarry or pitchy content of petroleum coke contained in a friction element may soften to a gummy condition, or even if that portion of the coke near the surface of the element tends to liquefy, depending upon the temperature to which a friction element containing such material is subjected in use, it does not tend to exude from the inner part of the element to the surface of the friction element and glaze or cause over lubrication as sometimes do the tarry or pitchy materials which are found in natural pyrogenous residues such as ordinary asphalts, particularly when such latter materials are present in excess in friction elements;

(d) A natural pyrobituminous material, such as bituminous coal, is characterized by a comparatively high percentage of constituents which are volatile upon destructive distillation of the material at temperatures starting at 500° F. to 600° F., whereas petroleum coke is but very slightly volatile when heated to such temperatures, thereby enabling friction elements containing petroleum coke to withstand higher temperatures than natural pyrobituminous material without loss of the volatile content thereof;

(e) The tarry or pitchy fraction of petroleum coke imparts to friction elements containing such material the desirable properties imparted to friction elements by natural pyrobituminous materials including the imparting to friction surfaces of the elements a finish that in appearance is not unlike that of what is called patent leather, it being believed that such finish results from the presence of the materials known as fillers rather than from the tarry and pitchy fractions from natural pyrobituminous material and petroleum coke, which fractions appear to protect rather than produce such finish;

(f) Friction elements containing petroleum coke as an ingredient are more heat resistant than friction elements containing natural pyrobituminous materials and the like, due to the fact that the petroleum coke content of such friction elements has already been subjected, during its manufacture, to temperatures which are in excess of the temperatures to which friction elements are subjected in use and by reason of this fact friction elements containing petroleum coke are able to withstand, without disintegration or deterioration, the high temperatures to which friction elements are subjected in heavy duty use and under severe service conditions;

(g) Friction elements containing petroleum coke usually do not wear away as rapidly as friction elements containing natural pyrobituminous materials in those instances where the elements are subjected to heavy duty use and severe service conditions.

(h) Another advantage which resides in the use of petroleum coke in friction elements is the fact that the benzol soluble content thereof varies in nature and quantity and petroleum cokes having different benzol soluble contents, that is, having varying or different amounts of tarry or pitchy materials of different natures both physically and chemically, are obtainable commercially. In accordance with this invention a petroleum coke or a blend of petroleum cokes having a preselected benzol soluble content is employed and a coke best suited for the needs of a particular friction element is chosen. The nature of the benzol soluble content is determined by the percentage of such content for the percentage decreases as the extent of processing of the coke increases and by selecting a coke having the proper percentage of benzol soluble content it is assured that the nature of such content will be suitable for the intended purpose.

It is to be noted, in this connection, that whereas petroleum cokes are available having a benzol soluble content or a percentage of tarry and pitchy materials in excess of three per cent (3%), by weight of the petroleum coke, and such petroleum cokes may, in some instances, be used in the practice of the present invention, it has been found that petroleum coke having a benzol soluble content of from approximately one and one-half per cent (1.5%) to approximately three per cent (3%), by weight of the petroleum coke, is best suited for the practice of and for the purposes of the present invention.

(i) While friction elements made according to the present invention and intended for heavy duty use or use under severe service conditions have the advantages which have been set forth hereinbefore, as well as those which will be set forth hereinafter, friction elements containing petroleum coke are equally as well suited, and are equally as satisfactory and efficient, for lighter duty service and use under less severe service conditions and when so used are as satisfactory and efficient as friction elements containing natural pyrobituminous materials or natural pyrogenous residues.

It is to be understood, in connection with what has been said hereinbefore as well as what will be stated hereinafter relative to friction elements containing natural pyrobituminous materials that the destructive distillation process to which such materials are subjected in use takes place only when the elements are subjected to heat and occurs only at and immediately below the friction surfaces or wearing faces of elements in which such material is contained and progresses inwardly only as the friction surfaces of the elements are worn away in use.

On the other hand, in the use of friction elements containing petroleum coke the desired tarry and pitchy material is already or initially present as such and is immediately available upon the friction surfaces or wearing faces of the elements as soon as the elements are employed to effect deceleration and it is not necessary to subject the coke exposed upon the friction surfaces or wearing faces of the elements to a destructive distillation process in order to produce the desired friction-increasing tarry and pitchy substances upon the friction surfaces of the elements, as is the case in friction elements containing natural pyrobituminous material. Moreover, there is no increase in the wear factor due to loss of volatile material as the temperatures to which elements containing petroleum coke increase. It should be noted that petroleum coke, to the use of which in friction elements the present invention pertains, is not to be confused with ordinary commercial or so-called oven coke, which is useless for the purposes contemplated by the present invention. The physical properties of petroleum coke vary decidedly from those of ordinary commercial or so-called oven coke, for a number of reasons, among which are the following: (a) the pitchy or tarry fraction of petroleum coke is almost entirely absent in ordinary commercial or oven coke; (b) petroleum coke is soft in texture, rather than abrasive, as is ordinary oven coke, due to the type of soft carbon which is found in petroleum coke and to its relatively low mineral ash content, as compared to ordinary commercial or oven coke which has a relatively high mineral ash content and contains a rather abrasive type of carbon; (c) petroleum coke has less tendency than ordinary commercial or oven coke to absorb the binders which are used in friction elements, this being probably due, in part at least, to the high tarry and pitchy content of petroleum coke, as compared to ordinary commercial or oven coke; and (d) the percentage of tarry or pitchy materials in ordinary commercial or oven coke is so low that this type of coke can not be used in friction elements for the purposes of the present invention, and if and when used in friction elements can function only as an inert filler, and as such may produce an undesirable abrasive action and reduce friction at lower pressures.

The underlying reasons for certain of the differences, hereinbefore pointed out, between petroleum coke, ordinary oven or commercial coke, and bituminous coal, will be understood by reference to the following data which show the difference in composition between typical specimens of bituminous coal, petroleum coke and ordinary oven or commercial (Solvay) coke.

| Material | Ash | Benzol soluble portion | Volatile content | Sp. vol. |
| --- | --- | --- | --- | --- |
| | Per cent | Per cent | Per cent | |
| Bituminous coal | 4.60 | 0.35 | 34.55 | 0.830 |
| "Solvay" coke | 3.70 | 0.11 | 1.60 | 0.560 |
| Petroleum coke | 1.45 | 2.89 | 13.30 | 0.765 |

Suitable typical and illustrative formulae which may be followed in making friction elements according to the present invention are the following, in which all parts indicated are by weight:

*Example No. 1*

| | Parts |
| --- | --- |
| Asbestos | 65 |
| Binder (purely polymerized linseed oil) | 15 |
| Solvent (petroleum naphtha) | 8 |
| Sulphur | 3 |
| Petroleum coke (benzol soluble content about 3%, by weight) | 10 |
| Carbon black | 3 |

*Example No. 2*

| | Parts |
| --- | --- |
| Asbestos | 65 |
| Binder (heat reactive phenolic resin) | 20 |
| Solvent (petroleum naphtha) | 8 |
| Petroleum coke (benzol soluble content about 3%, by weight) | 20 |

Friction elements made according to the foregoing Examples Nos. 1 and 2 are particularly adapted and intended for use upon passenger cars and light trucks and other automotive vehicles and in general under ordinary service conditions and where the friction elements are not to be customarily subjected to severe, that is, high temperatures.

A suitable example for making friction elements especially intended and adapted for heavy duty use and under severe service conditions, is the following, in which all parts indicated are by weight:

*Example No. 3*

| | Parts |
|---|---|
| Rubber cement (40% rubber) | 21.0 |
| Binder (phenolic molding resin) | 6.5 |
| Petroleum coke (benzol soluble content about 3%, by weight) | 12.0 |
| Barytes | 13.5 |
| Sulphur | 4.0 |
| Powdered lead | 10.0 |
| Litharge | 1.0 |
| Asbestos | 37.0 |

It will be understood that the formulae which are given in the foregoing examples are merely typical and illustrative of formulae which may be followed in making friction elements according to the practice of the present invention and that the present invention is not limited thereto since this invention is primarily directed to the use of petroleum coke in friction elements without regard to the particular nature thereof.

It will also be understood that while the binder specified in Example No. 1 above is a purely polymerized and not otherwise chemically changed vegetable drying oil, such as linseed oil, and while the binders which are specified in Examples Nos. 2 and 3 are preferably phenolic resins of the heat-reactive type, a rubber-resin binder might be used, in which case a suitable vulcanizing agent or agents may be used. Thus, it is to be understood that the present invention is not limited to the use of the particular types of binders which are specified above and in the foregoing examples, nor to the use of any particular type or types of binder, and among other suitable binders which may be used, in addition to those specified above, are oil modified phenol resins and various other heat-reactive resins of the phenolic type, such as cresylic acid resins, or other resins possessing suitable heat-resistant properties and suitable friction characteristics.

Thus, for example, suitable friction elements may be made by modifying the foregoing Examples Nos. 1 and 2 by substituting an oil-modified phenol resin as the binder in place of the purely polymerized vegetable oil which is specified as the binder in Example No. 1, or in place of the heat-reactive phenolic resin which is specified as the binder in Example No. 2.

It should likewise be understood that the present invention does not reside primarily in the several formulae and compositions which are set forth in the foregoing examples but rather, broadly in the use of petroleum coke in friction elements to realize the advantages hereinbefore set forth.

By the term "petroleum coke" as used herein and as used hereinafter in the claims, I mean a carbonaceous material which is a by-product of petroleum cracking and is the solid residue remaining in the refinery stills after most of the hydrocarbons of crude oil have been extracted by the application of heat or of heat and pressure, which always contains an appreciable portion of benzol-soluble pitchy material.

It will be understood that petroleum coke imparts to friction elements the hereinbefore mentioned and other desirable properties and that, therefore, the foregoing description is not to be taken as a limitation of my invention and I reserve the right to make any and all changes and modifications that fall within the ambit of the following claims.

I claim:

1. A friction element containing petroleum coke.

2. A friction element containing petroleum coke, said petroleum coke being finely divided and uniformly distributed throughout the wearing portion of said friction element.

3. A friction element including petroleum coke as an initial ingredient thereof, said petroleum coke having a benzol soluble content not substantially in excess of three per cent, (3%), by weight of the petroleum coke, prior to its incorporation into said friction element.

4. A friction element including petroleum coke as an initial ingredient thereof, said petroleum coke having a benzol soluble content not substantially less than one and one-half per cent, (1.5%), by weight of the petroleum coke, prior to its incorporation into said friction element.

5. A friction element including petroleum coke as an initial ingredient thereof, said petroleum coke having a benzol soluble content not substantially less than one and one-half per cent, (1.5%), nor substantially more than three per cent (3%), by weight of the petroleum coke, prior to its incorporation into said friction element.

6. The improvement in the art of making friction elements which comprises incorporating petroleum coke into a friction element.

7. The improvement in the art of making friction elements which comprises incorporating into a friction element petroleum coke having a benzol soluble content, prior to its incorporation into said friction element, not substantially in excess of three per cent, (3%), by weight, of the petroleum coke.

8. The improvement in the art of making friction elements which comprises incorporating into a friction element petroleum coke having a benzol soluble content, prior to its incorporation into said friction element, of not substantially less than one and one-half per cent (1.5%), by weight, of the petroleum coke.

9. The improvement in the art of making friction elements which comprises incorporating into a friction element petroleum coke having a benzol soluble content, prior to its incorporation into said friction element, of not substantially less than one and one-half per cent (1.5%), nor substantially more than three per cent, (3%), by weight of the petroleum coke.

10. The method in the art of braking which comprises incorporating into a braking member petroleum coke having a tarry or pitchy content which can be rendered effective for braking purposes upon the friction surface of a braking member under the action of the heat of friction generated during the use of the braking member, and then frictionally generating the heat necessary to render the tarry or pitchy content of the petroleum coke effective for braking purposes upon the braking surface of the braking member by pressing the braking member into contact with a member to be braked.

11. The method in the art of braking which comprises incorporating into a braking member petroleum coke having a tarry or pitchy content, prior to its incorporation into said braking member, not substantially in excess of three per cent, (3%), by weight of the petroleum coke, and which can be rendered effective for braking purposes upon the friction surface of a braking member under the action of the heat of friction generated during the use of the braking member, and then frictionally generating the heat necessary to render the tarry or pitchy content of the petroleum coke effective for braking purposes upon the braking surface of the braking member by pressing the braking member into contact with a member to be braked.

12. The method in the art of braking which comprises incorporating into a braking member petroleum coke having a tarry or pitchy content, prior to its incorporation into said braking member, of not substantially less than one and one-half per cent, (1.5%), by weight of the petroleum coke, and which can be rendered effective for braking purposes upon the friction surface of a braking member under the action of the heat of friction generated during the use of the braking member, and then frictionally generating the heat necessary to render the tarry or pitchy content of the petroleum coke effective for braking purposes upon the braking surface of the braking member by pressing the braking member into contact with a member to be braked.

13. The method in the art of braking which comprises incorporating into a braking member petroleum coke having a tarry or pitchy content, prior to incorporation into said braking member, of not substantially less than one and one-half per cent (1.5%), nor substantially more than three per cent (3%), by weight of the petroleum coke, and which can be rendered effective for braking purposes upon the friction surface of a braking member under the action of the heat of friction generated during the use of the braking member, and then frictionally generating the heat necessary to render the tarry or pitchy content of the petroleum coke effective for braking purposes upon the braking surface of the braking member by pressing the braking member into contact with a member to be braked.

RAY E. SPOKES.